US010740852B1

(12) United States Patent
George et al.

(10) Patent No.: US 10,740,852 B1
(45) Date of Patent: Aug. 11, 2020

(54) CLASSIFYING MERCHANTS

(71) Applicant: Square, Inc., San Francisco, CA (US)

(72) Inventors: Matthew R. George, San Francisco, CA (US); Jonathan Steven Landy, Berkeley, CA (US); John Berian James, San Francisco, CA (US); Mehmet Zahit Guneri, Sunnyvale, CA (US); James A. Esposito, Brooklyn, NY (US); Drew A. Edmond, San Francisco, CA (US)

(73) Assignee: Square, Inc., San Francisco, CA (US)

(*) Notice: Subject to any disclaimer, the term of this patent is extended or adjusted under 35 U.S.C. 154(b) by 743 days.

(21) Appl. No.: 14/747,064

(22) Filed: Jun. 23, 2015

(51) Int. Cl.
*G06Q 40/00* (2012.01)
*G06Q 20/20* (2012.01)

(52) U.S. Cl.
CPC .......... *G06Q 40/12* (2013.12); *G06Q 20/202* (2013.01)

(58) Field of Classification Search
CPC .... G06Q 10/06; G06Q 10/0637; G06Q 30/04; G06Q 40/12; G06Q 30/02; G06F 16/951; G06F 16/9535; G06F 16/285
See application file for complete search history.

(56) References Cited

U.S. PATENT DOCUMENTS

| 6,564,213 | B1 | 5/2003 | Ortega et al. |
| 6,910,017 | B1 | 6/2005 | Woo et al. |
| 7,254,774 | B2 | 8/2007 | Cucerzan et al. |
| 7,447,678 | B2 | 11/2008 | Taylor et al. |
| 7,610,233 | B1 | 10/2009 | Leong et al. |
| 7,831,584 | B2 | 11/2010 | Rothman |
| 8,571,985 | B1 * | 10/2013 | Grigg ...................... G06Q 40/02 705/35 |
| 9,741,030 | B2 * | 8/2017 | Tavares ................. G06Q 40/12 |
| 9,836,743 | B2 * | 12/2017 | Celikyilmaz .......... G06Q 40/12 |
| 10,269,077 | B2 * | 4/2019 | Celikyilmaz .......... G06Q 40/12 |
| 10,304,056 | B1 * | 5/2019 | Izenson ................ G06Q 20/322 |
| 2002/0107746 | A1 | 8/2002 | Jacoby, Jr. |
| 2005/0004889 | A1 | 1/2005 | Bailey et al. |
| 2005/0102202 | A1 | 5/2005 | Linden et al. |
| 2005/0120006 | A1 * | 6/2005 | Nye ....................... G06F 16/954 |
| 2006/0095370 | A1 * | 5/2006 | Seth ..................... G06Q 20/102 705/40 |
| 2008/0040323 | A1 | 2/2008 | Joshi |
| 2008/0270275 | A1 | 10/2008 | McElroy et al. |
| 2009/0276522 | A1 | 11/2009 | Seidel |

(Continued)

OTHER PUBLICATIONS

Non-Final Office Action dated Feb. 2, 2010, for U.S. Appl. No. 11/963,592, of Rothman, S., filed Dec. 21, 2007.

(Continued)

*Primary Examiner* — Florian M Zeender
*Assistant Examiner* — Milena Racic
(74) *Attorney, Agent, or Firm* — Lee & Hayes, P.C.

(57) ABSTRACT

Techniques and arrangements for industry vertical classification of merchants using merchant signals, based, in part, on comparing the merchant signals with collected business class profiles. The merchant signals can include reported data, collected data, and third-party data associated with the merchant. The techniques can include identifying one or more business class profiles using the data associated with the merchant and classifying and/or reclassifying the merchant within a business class using the one or more identified business class profiles.

20 Claims, 10 Drawing Sheets

(56) References Cited

U.S. PATENT DOCUMENTS

| | | | |
|---|---|---|---|
| 2010/0023311 A1 | 1/2010 | Subrahmanian et al. | |
| 2010/0057786 A1* | 3/2010 | Hardy-McGee | G06Q 10/06 |
| | | | 705/7.36 |
| 2010/0106652 A1 | 4/2010 | Sandholm et al. | |
| 2011/0178849 A1 | 7/2011 | Rane et al. | |
| 2012/0290422 A1* | 11/2012 | Bhinder | G06Q 20/0453 |
| | | | 705/21 |
| 2013/0073342 A1 | 3/2013 | Crump et al. | |
| 2013/0173320 A1 | 7/2013 | Bank et al. | |
| 2013/0231976 A1 | 9/2013 | Tavares et al. | |
| 2014/0012704 A1* | 1/2014 | Mizhen | G06Q 30/06 |
| | | | 705/26.41 |
| 2015/0220958 A1* | 8/2015 | Tietzen | G06Q 30/0226 |
| | | | 705/14.15 |
| 2017/0344656 A1 | 11/2017 | Koren et al. | |

OTHER PUBLICATIONS

Notice of Allowance dated Sep. 16, 2010, for U.S. Appl. No. 11/963,592, of Rothman, S., filed Dec. 21, 2007.

Non-Final Office Action dated Jan. 6, 2016, for U.S. Appl. No. 14/184,447, of Kim, M., et al., filed Feb. 19, 2014.

Final Office Action dated Oct. 11, 2016, for U.S. Appl. No. 14/184,447, of Kim, M., et al., filed Feb. 19, 2014.

Non-Final Office Action dated Mar. 20, 2017, for U.S. Appl. No. 14/184,447, of Kim, M., et al., filed Feb. 19, 2014.

Final Office Action dated Aug. 31, 2017, for U.S. Appl. No. 14/184,447, of Kim, M., et al., filed Feb. 19, 2014.

Non-Final Office Action dated Aug. 31, 2017, for U.S. Appl. No. 15/640,221, of Brosamer, J., et al., filed Jun. 30, 2017.

Final Office Action dated Feb. 1, 2018, for U.S. Appl. No. 15/640,221, of Brosamer, J., et al., filed Jun. 30, 2017.

Non-Final Office Action dated Sep. 7, 2018, for U.S. Appl. No. 15/640,221, of Brosamer, J., et al. filed Jun. 30, 2017.

Non-Final Office Action dated Jun. 27, 2019, for U.S. Appl. No. 15/640,221, of Brosamer, J., et al., filed Jun. 30, 2017.

Final Office Action dated Mar. 7, 2019, for U.S. Appl. No. 15/640,221 of Brosamer, J., et al., filed Jun. 30, 2017.

Advisory Action dated May 14, 2019, for U.S. Appl. No. 15/640,221, of Brosamer, J., et al., filed Jun. 30, 2017.

Final Office Action dated Jan. 8, 2020, for U.S. Appl. No. 15/640,221, of Brosamer, J., et al., filed Jun. 30, 2017.

Non-Final Office Action dated Feb. 13, 2020, for U.S. Appl. No. 15/787,519, of Brennan, K., et al., filed Oct. 18, 2017.

Advisory Action dated Mar. 19, 2020, for U.S. Appl. No. 15/640,221, of Brosamer, J., et al., filed Jun. 30, 2017.

\* cited by examiner

CLASSIFICATION INTERFACE 128

Current Business Class: 5399
(Miscellaneous General Merchandise)

Based on your recent activity, we recommend that you switch your business classification to one of the following:

Business Class: 5411
(Grocery Stores, Supermarkets)

Business Class: 5462
(Bakeries)

Business Class: 5499
(Miscellaneous Food Stores)

Business Class: 5814
(Fast Food Restaurants)

If you would like to update your business class, please select one of the listed business classes.

Thank you.

Fig. 3

CLASSIFYING MERCHANTS

BACKGROUND

Credit card companies classify merchants operating retail stores using a business code based on the types of goods and services that a merchant provides. For instance, a merchant category code (MCC) is a four-digit number assigned to a merchant by credit card companies when the merchant starts accepting cards offered by the credit card companies as a form of payment from customers of the merchant. The MCC affects the fees that the merchant pays to the credit card companies, and determines if the merchant needs to report payments to the Internal Revenue Service (IRS) for tax purposes. Therefore, it is beneficial for a merchant to be classified using the correct MCC so that the merchant is not paying more fees than the credit card companies require and/or so that the merchant reports necessary payment information to the IRS.

Besides benefits to the merchant, there are also benefits to the credit card companies and/or customers of the merchant. For instance, credit card companies can better understand aspects of various merchant businesses, such as popularity among different business segments. Additionally, a customer's credit card statement will reflect transactions more accurately, thus reducing potential chargebacks and support inquiries.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 illustrates an example user interface that a POS device of a merchant may display, where the user interface includes a recommendation for four business classes for merchant selection.

DETAILED DESCRIPTION

Figure 1:
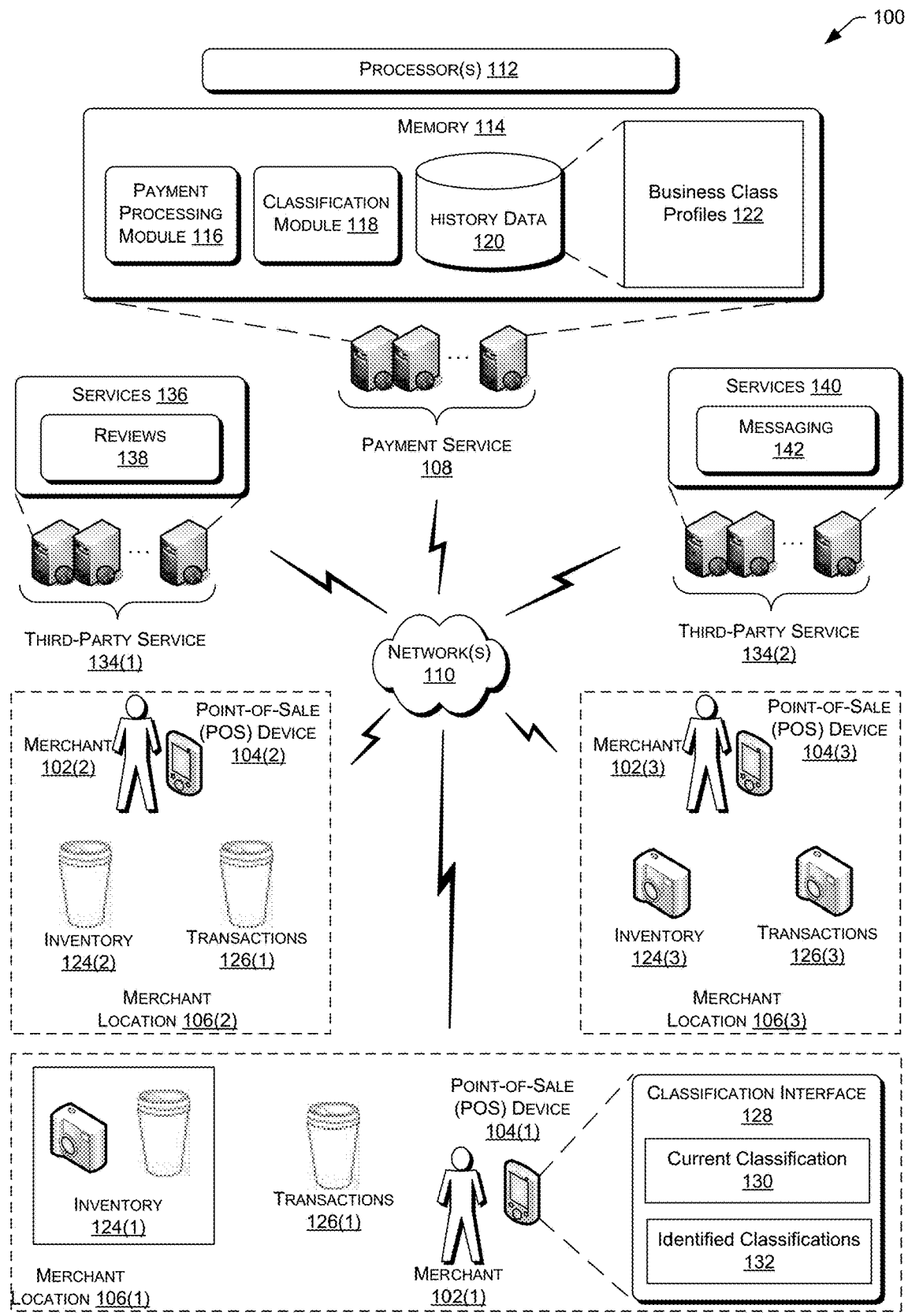
FIG. 1 illustrates an example environment that includes a merchant receiving, from a payment service, an updated business classification. In this example, the payment service is receiving data from the merchant, comparing the data to business class profiles, and determining the updated business classification for the merchant based at least in part on the comparing.

Some examples described herein include techniques and arrangements for classifying merchants within business classes by comparing information associated with the merchant to collected business class profiles. In the techniques described herein, reclassification of a merchant can include classifying a merchant in a business class and/or reclassifying a merchant to a new business class. A business class can include a merchant category code (MCC) assigned to the merchant by one or more entities. For example, credit card companies, a payment service, and/or another entity may classify a merchant using one of various MCCs. A merchant can be assigned within a MCC based on a type of items and/or services that the merchant provides.

To identify the types of items and/or services that a merchant provides, a payment service (and/or other service) can collect merchant signals for the merchant. Merchant signals for a merchant may include reported data, collected data, and third-party data associated with the merchant. For example, the payment service can receive reported data from a point-of-sale (POS) device of a merchant and/or an online merchant interface to the payment service that is accessible by the merchant. The reported data can indicate a selected business class for the merchant, a business name of the merchant, a class of items offered by the merchant (e.g., inventory items), and/or a geographical location of the merchant.

The payment service can further receive collected data from the POS device of the merchant. The collected data can indicate transactional information for the merchant, such as classes of items acquired by customers from the merchant and payment activity for the merchant. Payment activity for the merchant may include tips the merchant receives, ticket sizes for the merchant, volumes of item and/or service provided (e.g., sold, rented, leased, etc.) by the merchant, a time of day for providing items and/or services, or other sorts of data corresponding to transactions for the merchant.

Additionally, the payment service can receive third-party data associated with the merchant from one or more third-party services. For instance, the payment service can receive an email address for the merchant from an email service or provider (and/or POS device of the merchant), merchant reviews for the merchant from a review service or provider (e.g., blogging service), and/or other sorts third-party data associated with the merchant. The payment service can then generate a business profile for the merchant that includes the reported data, the collected data, and the third-party data, and use the data included in the business profile to classify the merchant in a business class and/or reclassify the merchant to a new business class.

For instance, the payment service can compare data in the business profile of the merchant to a collection of business class profiles. Each business class profile may be associated with a business class (e.g., MCC) and include data about the business class and/or data about merchants that are assigned to the business class. For example, the data may include one or more words that merchants assigned to the business class commonly use in their business names (e.g., "pub" for merchants that are classified as bars). The data may further include a class of items associated with the business class (e.g., items offered by the merchants assigned to the business class, items acquired by customers from the merchants assigned to the business class, etc.), payment activity for merchants assigned to the business class (e.g., tips the merchant receives, ticket sizes for the merchant, volumes of items sold by the merchant, time of day for sales of items and/or services), and/or geographical locations of the merchants assigned to the business class. The payment service can determine the data based on information that is common to the business class and/or the payment service can receive the data from merchants that are assigned to the business class.

In comparing data from the business profile of the merchant to the business class profiles, the payment service can identify one or more business class profiles that are similar to the business profile of the merchant. For example, the payment service can identify business class profiles that include business names that are similar to the business name of the merchant. Similar business names can include one or more words that are common between the business names. For instance, the business name of the merchant may include the word "pub." The payment service can then identify business class profiles that include merchants that also use the word "pub" in the merchants' business names. The payment service can then determine that the business profile of the merchant is similar to those identified business class profiles.

For another example, the payment service can identify one or more business class profiles based on the one or more business class profiles including transactional information that is similar to the transactional information of the merchant. For instance, the payment service can identify business class profiles that include the same and/or similar class of items as the class of items offered by the merchant, the same and/or similar class of items as the class of items acquired by customers from the merchant, and/or payment activity that is within a threshold value as the payment activity of the merchant. As discussed above, the payment activity for a merchant may include a percentage of tips that the merchant receives, ticket sizes for the merchant, and/or volumes of items customers acquire from the merchant.

For example, the payment service can identify business class profiles that are similar to the business profile of the merchant based on the business class profiles including a revenue that is within a threshold revenue (e.g., within a set percentage or range) as revenue of the merchant. For another example, the payment service can identify business class profiles that include an amount of tips (e.g., total tip amount and/or percentage of revenue that includes tips) that is within a threshold tip (e.g., within a set percentage or range) as an amount of tips of the merchant. Additionally, the payment service can further perform similar methods to identify business class profiles that include similar ticket sizes as the merchant and/or similar volume sizes of acquired items as the merchant.

When using a threshold to determine similarities between business class profiles and the business profile of the merchant (and/or data included in the business profile of the merchant), the payment service and/or another entity can set a threshold value. For example, the payment service and/or other entity can set the threshold to include a specified percentage, such as 50%, 75%, 90%, 100%, or the like. For another example, the payment service and/or other entity can set the threshold to include a specified value range. For instance, when using revenue, the payment service can set ranges that include $100,000-$200,000 a month, $750,000-$1,000,000 a year, or the like.

The payment service can further use the third-party data to identify the one or more business class profiles that are similar to the business profile of the merchant. For example, the payment service can determine classes of items acquired by customers from the merchant based on customer reviews that are associated with the merchant. The payment service can then use that determination to identify business class profiles that include the class of items. For another example, the payment service can use the email address of the merchant to identify one or more business class profiles that are similar to the business profile of the merchant. For instance, if the email address for the merchant ended with @myrestaurant.com, the payment service can determine that the merchant is a restaurant and use that determination to identity business class profiles that are associated with restaurants.

After identifying the one or more business class profiles that are similar to the business profile of the merchant, the payment service can either classify the merchant using a business class corresponding to one of the business class profiles, or reclassify the merchant to a new business class. When classifying and/or reclassifying a merchant with a business class, the payment service can base the determination using one or more rules.

For instance, the payment service can use rules that select the business class from the one or more identified business classes based on fees charged to the merchant. For example, credit card companies and/or other entities may require the merchant to pay different rates (e.g., fees) based on which business class (e.g., MCC) is assigned to the merchant. As such, the payment service can determine fees that will be charged to the merchant for each of the identified business classes and rank the business classes based on the fees. The payment service can then use a rule that selects the business class that charges, for instance, the least amount of fees to the merchant.

Besides rules based on fees to the merchant, the payment service can implement a rule that prioritizes selection of certain business classes over other business classes. For example, if the payment service determines that a particular merchant may fairly be associated with a first business class "restaurants" and a second business class "bars", the payment service may select the more inclusive business class, which in this case comprises the first business class "restaurants".

Additionally, the payment service can allow the merchant to select a business class from the one or more identified business classes. For instance, the payment service can send a message indicating the identified business classes to the POS device of the merchant. The POS device can then provide the merchant with an interface that includes the identified business classes for selection. In response to a merchant selection of a business class using the interface, the POS device can then send a message indicating the selection to the payment service so that the payment service can classify and/or reclassify the merchant using the selected business class.

In reclassifying a merchant, the payment service can perform the techniques described above at given time intervals. For instance, the payment service may continue collecting data associated with the merchant and update the business profile of the merchant using the data. The payment service can then use the data included the updated business profile of the merchant to determine whether the merchant is classified in the correct business class at each given time interval. For example, the payment service can make the determination each week, month, year, or some other give time period.

Although the techniques described describe reclassifying the business class of the merchant, the payment service can alternatively determine not to reclassify the merchant based on the identified business class profiles. For instance, the payment service can determine that the current business class of the merchant accurately represents the merchant. As a result, the payment service can determine not to reclassify the merchant into a new business class.

Additionally, while the above provides classifying and/or reclassifying a single merchant to a business class, the described techniques can classify and/or reclassify any number of merchants using the examples described above. For instance, the payment service may generate business profiles for more than one merchant and compare each of the business profiles to the business class profiles associated with the various business classes. The payment service can then identify one or more merchants that are classified in the wrong business class and/or classified in a business class that is not beneficial to the merchant. In response, the payment service can flag these merchants and either reclassify the merchants to a new business class, or provide the merchants with alternative business classes for the merchants' selections.

Furthermore, while the techniques described above are illustrated as being performed by the payment service, in other instances, the POS device of the merchant can collect the data associated with the merchant, generate a business profile for the merchant using the data, compare the data included in the business profile of the merchant to the business class profiles, and classify and/or reclassify the merchant based on the comparison. The POS device can then send a message indicating the business class to the payment service and/or another service (e.g., one or more credit card companies).

Figure 9:
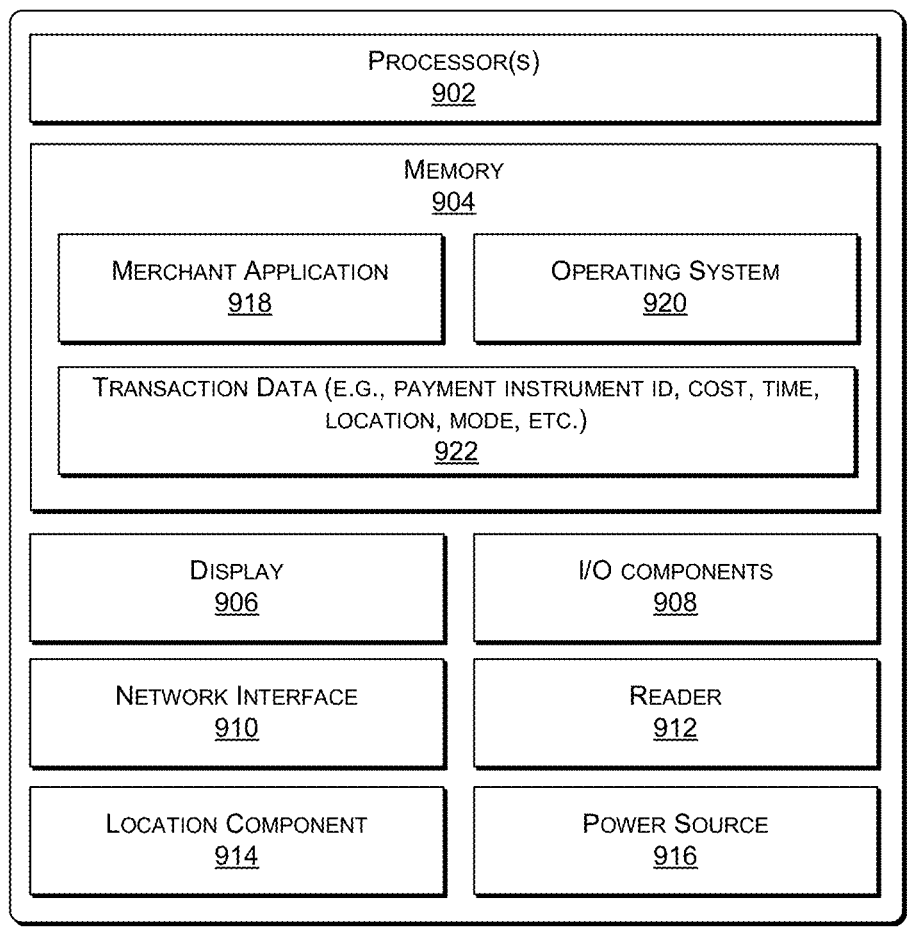
FIG. 9 illustrates select components of a POS device that a merchant described herein may utilize.

FIG. 1 illustrates an example environment 100 that includes a merchant 102(1) operating a point-of-sale (POS) device 104(1) to engage in various transactions with respective customers. Similarly, merchants 102(2)-(3) may operate POS devices 104(2)-(3) respectively to engage in various transactions with respective customers. The POS device 104(1) may comprise any sort of mobile or non-mobile device that includes an instance of a merchant application that executes on the respective device (as illustrated in FIG. 9). The merchant application may provide POS functionality to the POS device 104(1) to enable the merchant 102(1) (e.g., an owner, employees, etc.) to accept payments from the customers. In some types of businesses, the POS device 104(1) may correspond to a store or other place of business of the merchant, and thus, may be a fixed location that typically does not change on a day-to-day basis. In other types of businesses, however, the POS device 104(1) may change from time to time, such as in the case that the merchant operates a food truck, is a street vendor, a cab driver, etc., or has an otherwise mobile business, e.g., in the case of merchants who sell items at buyer's homes, places of business, and so forth.

As used herein, a merchant may include any business engaged in the offering of goods or services for acquisition by customers. Actions attributed to a merchant may include actions performed by owners, employees, or other agents of the merchant and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires an item from a merchant, and in return, the customer provides payment to the merchant.

As used herein, a transaction may include a financial transaction for the acquisition of items (goods and/or services) that is conducted between a customer and a merchant. For example, when paying for a transaction, the customer can provide the amount that is due to the merchant using a payment instrument (e.g., a debit card, a credit card, a stored-value or gift card, a check, through an electronic payment application on a device carried by the customer, or the like). The merchant can interact with the POS device 104(1) to process the transaction, such as by inputting (e.g., manually, via a magnetic card reader or an RFID reader, etc.) an identifier associated with the payment instrument. For example, a payment instrument of the customer 106 may include one or more magnetic strips for providing card and customer information when swiped in a card reader. In other examples, other types of payment cards may be used, such as smart cards having a built-in memory chip that is read by the POS device 104(1) when the card is "dipped" into the reader, a radiofrequency identification tag, or so forth.

During the transaction, the POS device 104(1) can determine transaction information describing the transaction, such as the identifier of the payment instrument, an amount of payment received from the customer, the item(s) acquired by the customer, a time, place and date of the transaction, a card network associated with the payment instrument, an issuing bank of the payment instrument, and so forth. The POS device 104(1) can send the transaction information to a payment service 108 over a network 110, either substantially contemporaneously with the conducting of the transaction (in the case of online transactions) or later when the device 104(1) is in the online mode (in the case offline transactions).

In an offline transaction, the POS device 104(1) may store one or more characteristics associated with the transaction (i.e., the transaction information), such as a cost of the transaction, a time of day at which the transaction occurred, a day of the week at which the transaction occurred, a location at which the transaction took place, an item that the customer obtained, and a payment instrument used in the transaction. After conducting an offline transaction with one of the customers, the POS device 104(1) may provide the stored information to the payment service 108 over the network 110. The network 110 may represent any one or more wired or wireless networks, such as a WiFi network, a cellular network, or the like. In an online transaction, the POS device 104(1) may send this information to the payment service 108 over the network 110 substantially contemporaneously with the transaction with the customer.

As illustrated, the payment service 108 may include one or more processors 112 and memory 114, which may store a payment-processing module 116, a classification module 118, and historical data 120 storing different business class profiles 122 associated with various business classes.

The payment processing module 116 may function to receive the information regarding a transaction from the POS device 104(1) and attempt to authorize the payment instrument used to conduct the transaction, as described above. The payment processing module 116 may then send an indication of whether the payment instrument has been approved or declined back to the POS device 104(1).

When a customer and a merchant enter into an electronic payment transaction, the transaction is processed by electronically transferring funds from a financial account associated with the customer to a financial account associated with the merchant. As such, the payment processing module 116 may communicate with one or more computing devices of a card network (or "card payment network"), e.g., MasterCard®, VISA®, over the network 110 to conduct financial transactions electronically. The payment processing module 116 can also communicate with one or more computing devices of one or more banks over the network 110. For example, the payment processing module 116 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

In some instances, the payment service 108 can classify and/or reclassify a business class for the merchant 102(1) based on business class profiles 122. A business class can include a merchant category code (MCC) assigned to the merchant 102(1) by one or more entities. For example, credit card companies, a payment service, and/or another entity may classify the merchant 102(1) using one of various MCCs. The merchant 102(1) can be assigned within a MCC based on a type of items and/or services that the merchant provides.

FIG. 1, for instance, illustrates an example where the payment service 108 generates business class profiles 122 for various business classes. The payment service 108 can generate each of the business class profiles 122 using data that represents information that is common to the respective business class and/or data that the payment service 108 receives from merchants that are assigned to the respective business class. The information that is common the respective business class can include a class of items associated with the business class and/or a class of services associated with the business class. The data that the payment service 108 receives from merchants can include business names of the merchants assigned to the business, classes of items offered by the merchants assigned to the business class, classes of items acquired by customers from the merchants assigned to the business class, transactional information for merchants assigned to the business class, geographical locations of merchants assigned to the business class, or other sorts of data that the payment service 108 can receive from merchants.

For instance, the payment service 108 can receive data from the POS devices 104(2)-(3) of merchants 102(2)-(3). The data may include business classes assigned to the merchants 102(2)-(3), business names for the merchants 102(2)-(3), classes of items offered (e.g., inventories 124(2)-(3)) by the merchants 102(2)-(3), classes of items acquired (e.g., transactions 126(1)-(2)) by customers from the merchant 102(2)-(3), transactional information for the merchant 102(2)-(3), and/or geographical locations (e.g., merchant locations 106(2)-(3)) of the merchants 102(2)-(3). The transactional information for the merchants 102(2)-(3) can include payment activity for the merchants 102(2)-(3), such as a revenue for the merchants 102(2)-(3), tips the merchants 102(2)-(3) receive, ticket sizes for the merchants 102(2)-(3), volumes of items or service the merchants 102(2)-(3) provide (e.g., sold, rented, borrowed, etc.), and times during the day that the items or services were provided.

To generate each of the business class profiles 122, the payment service 108 uses the data that represents commonly known information about the business classes and/or the data that the payment service 108 receives from the merchants 102(2)-(3). For instance, the payment service 108 can generate a business class profile 122 for grocery stores and supermarkets (e.g., business class 5411) using data that represents commonly known information about grocery stores and supermarkets. The payment service can further use data that the payment service receives from merchant 102(2), which can include a grocery store in the example of FIG. 1.

For example, a business class profile 122 corresponding to grocery stores and supermarkets can include data indicating common words that merchants within the business class use for business names (e.g., "grocery"), one or more classes of items associated with (e.g., offered by and/or provided by merchants) the business class (e.g., food), and transactional information common to the business class. The payment service 108 can determine the classes of items associated with the business class based on information that is common to the business class. For instance, grocery stores and supermarkets sell groceries (e.g., food). The payment service 108 can further determine the common words that merchants within the business class use for business names, classes of items offered by merchants assigned to the business class, classes of items acquired by customers from merchants assigned to the business class, and the transactional information common to the business class from data that the payment service 108 receives from merchants, such as merchant 102(2) in FIG. 1.

As illustrated in FIG. 1, the payment service 108 further receives data from the POS device 104(1) of the merchant 102(1). The data received from the POS device 104(1) of the merchant 102(1) can include reported data and collected data. Reported data can include a selected business class for the merchant 102(1), a business name for the merchant 102(1), a class of items offered (e.g., inventory 124(1)) by the merchant 102(1), a geographical location (e.g., merchant location 106(1)) for the merchant 102(1), and/or other sorts of reported data that the payment service 108 can receive from the merchant 102(1) and use to classify the merchant 102(1). Collected data can include a class of items that customers acquire (e.g., transactions 126(1)) from the merchant 102(1), transactional information for the merchant 102(1), and/or other sorts of collected data that the payment service 108 can receive from the merchant 102(1) and use to classify the merchant 102(1).

While receiving the data from the merchant 102(1), the payment service 108 may generate a business profile for the merchant 102(1). The business profile can include the reported data and/or the collected data associated with the merchant. The payment service 108 then uses the business profile of the merchant 102(1) and/or specific data within the business profile of the merchant 102(1) to identify one or more business class profiles 122 for the merchant 102(1). Using the identified business class profiles 122, the payment service 108 then classifies the merchant 102(1) within a business class and/or reclassifies the merchant 102(1) within a new business class.

For instance, the payment service 108 can compare data included in the business profile of the merchant 102(2) to the business class profiles 122 to identify one or more business class profiles 122 that are similar to the business profile of the merchant 102(1). For example, the payment service 108 can identify business class profiles 122 that include business names that are similar to the business name of the merchant 102(2). Similar business names can include one or more words that are common between the business name of the merchant 102(1) and business names associated with business class profiles 122. For instance, the business name of the merchant 102(1) may include the word "grocery." The payment service 108 can then identify business class profiles 122 that include merchants that also use the word "grocery" in the merchants' business names. The payment service 108 can then determine that the business profile of the merchant 102(1) is similar to the identified business class profiles 122.

For another example, the payment service 108 can identify one or more business class profiles 122 based on the one or more business class profiles 122 including transactional information that is similar to the transactional information of the merchant 102(1). For instance, the payment service 108 can identify business class profiles 122 that include the same and/or similar class of items as the class of items in the inventory 124(1) of the merchant 102(1), the same and/or similar class of items as the class of items acquired (e.g., transactions 126(1)) by customers from the merchant 102(1), and/or payment activity that is within a threshold value as the payment activity of the merchant 102(1). As discussed above, payment activity for the merchant 102(1) can include the revenue of the merchant 102(1), percentage of tips that the merchant 102(1) receives, ticket sizes for the merchant 102(1), and/or volumes of items customers acquire from the merchant 102(1).

For example, the payment service 108 can identify business class profiles 122 that are similar to the business profile of the merchant 102(1) based on the business class profiles 122 including a revenue that is within a threshold revenue (e.g., within a set percentage or range) as revenue of the merchant 102(1). For another example, the payment service 108 can identify business class profiles 122 that include an amount of tips (e.g., total tip amount and/or percentage of revenue that includes tips) that is within a threshold tip (e.g., within a set percentage or range) as an amount of tips of the merchant 102(1). The payment service 108 can further perform related methods to identify business class profiles 122 that include similar ticket sizes as the merchant 102(1) and/or similar volumes of acquired items as the merchant 102(1).

When using a threshold to determine similarities between business class profiles 122 and the business profile of the merchant 102(1) (and/or specific data included in the business profile of the merchant 102(1)), the payment service 108 and/or another entity can set the threshold. For example, the payment service 108 and/or other entity can set the threshold to include a specific percentage, such as 50%, 75%, 90%, 100%, or the like. For another example, the payment service 108 and/or other entity can set the threshold to include a specific value range. For instance, when using revenue, the payment service 108 can set ranges that include $100,000-$200,000 a month, $750,000-$1,000,000 a year, or the like.

Besides using reported data and collected data from the merchant 102(1), the payment service 108 can further use third-party data to identify business class profiles 122 for the merchant 102(1). For instance, as FIG. 1 illustrates, the payment service 108 can receive third-party data from each of third-party service 134(1) and third-party service 134(2). Third-Party service 134(1) can provide services 136 that includes reviews 138 of merchants 102(1)-(3). For example, third-party service 134(1) can host a blog or website that allows customers to post reviews 138 about merchants 102(1)-(3). The reviews 138 can include a listing of products and/or services the customers acquired from merchants 102(1)-(3), the forms payments the merchants 102(1)-(3) accept from the customers, the quality of service the customers received from the merchants 102(1)-(3), or the like. The payment service 108 can then use these reviews 138 to identifying business class profiles 122 for the merchant 102(1).

For instance, the payment service 108 can use the reviews 138 of the merchant 102(1) to determine which products the merchant 102(1) is actually providing (e.g., selling, renting, borrowing, etc.) to customers. For example, in FIG. 1, the merchant 102(1) may report to the payment service 108 that the merchant 102(1) offers items (e.g., electronics and food) in inventory 124(1) to customers, which may cause the merchant 102(1) to be placed within a first business class (e.g., miscellaneous general merchandise). However, based on the reviews 138, the payment service 108 can determine that the vast majority of sales of items actually includes transactions 126(1) (e.g., the food). Since the vast majority of sales is actually in food, the payment service 108 can determine that the merchant 102(1) can actually be placed within a second business class (e.g., grocery stores, supermarkets). Therefore, based on the reviews 138, the payment service 108 can reclassify the merchant 102(1) within the second business class.

In FIG. 1, the payment service 108 can also receive third-party data from third-party service 134(2). Third-Party service 134(2) can provide services 140 that include messaging 142 services for merchant 102(1)-(3). For example, third-party service 134(2) can host an email service for merchants 102(1)-(3). The payment service 108 can thus use email addresses received from third-party service 134(4) to identify business class profiles 122 for the merchant 102(1). For example, if the email address for the merchant 102(1) ended with @mygroceries.com, the payment service 108 can determine that the merchant 102(1) is a restaurant and use that determination to identity business class profiles 122 that are associated with restaurants.

After identifying the one or more business class profiles 122 that are similar to the business profile of the merchant 102(1), the payment service 108 can either classify the merchant 102(1) using a business class that corresponds to one of the identified business class profiles 122, or reclassify the merchant 102(1) within a new business class that corresponds to one of the identified business class profiles 122. When classifying and/or reclassifying the merchant 102(1) with a business class, the payment service 108 can implement one or more classifcation rules.

For instance, the payment service 108 can implement a rule that selects the business class from the one or more identified business classes that includes the lowest rate of fees for the merchant 102(1). For example, credit card companies and/or other entities may require the merchant 102(1) to pay different rates (e.g., fees) based on which MCC is assigned to the merchant 102(1). As such, the payment service 108 can select the MCC that requires the merchant 102(1) to pay the least amount of money in fees.

Additionally, the payment service 108 can implement a rule that prioritizes selection of certain business classes over other business classes. For example, if the payment service 108 identifies a first business class for the merchant 102(1) that is associated with miscellaneous general merchandise and second business class for the merchant 102(1) that is associated with grocery stores and supermarkets, the payment service 108 may select the second business class for the merchant 102(1). The payment service 108 can select the second business class based on a determination that customers are more likely to shop for groceries at grocery stores and supermarkets, rather than miscellaneous general merchandise stores. As such, classifying the merchant as a grocery store or supermarket is beneficial to the merchant 102(1) since it brings more customers to the merchant's 102(1) establishment.

Additionally, the payment service 108 can allow the merchant 102(1) to select a business class from the one or identified business classes. For instance, the payment service 108 can send a message indicating the identified business classes to the POS device 104(1) of the merchant 102(1). The POS device 104(1) can then provide the merchant 102(1) with a classification interface 128 that includes the current classification 130 for the merchant 102(1) and the identified classifications 132 for the merchant. The merchant 102(1) can then use the classification interface 128 to select one of the identified classifications 132. In response, the POS device 104(1) can then send a message indicating the selection to the payment service 108 so that the payment service 108 can classify and/or reclassify the merchant 102(1) using the selected business class.

Although not illustrated in FIG. 1, the payment service 108 can perform the techniques described above to each of the other merchants 102(2)-(3). For instance, the payment service 108 can use data received from the other merchants 102(2)-(3) and/or a generated business profile for each of the other merchant 102(2)-(3) to determine whether the other merchants 102(2)-(3) are classified in the correct business class and/or the business class that is most beneficial to the merchants 102(2)-(3). The payment service 108 can then flag any merchants 102(1)-(3) that are not classified in the correct business class and/or the business class that is most beneficial to the merchants 102(1)-(3). Finally, the payment service 108 can reclassify one or more of the flagged merchants 102(1)-(3) within a new business class.

Figure 2:
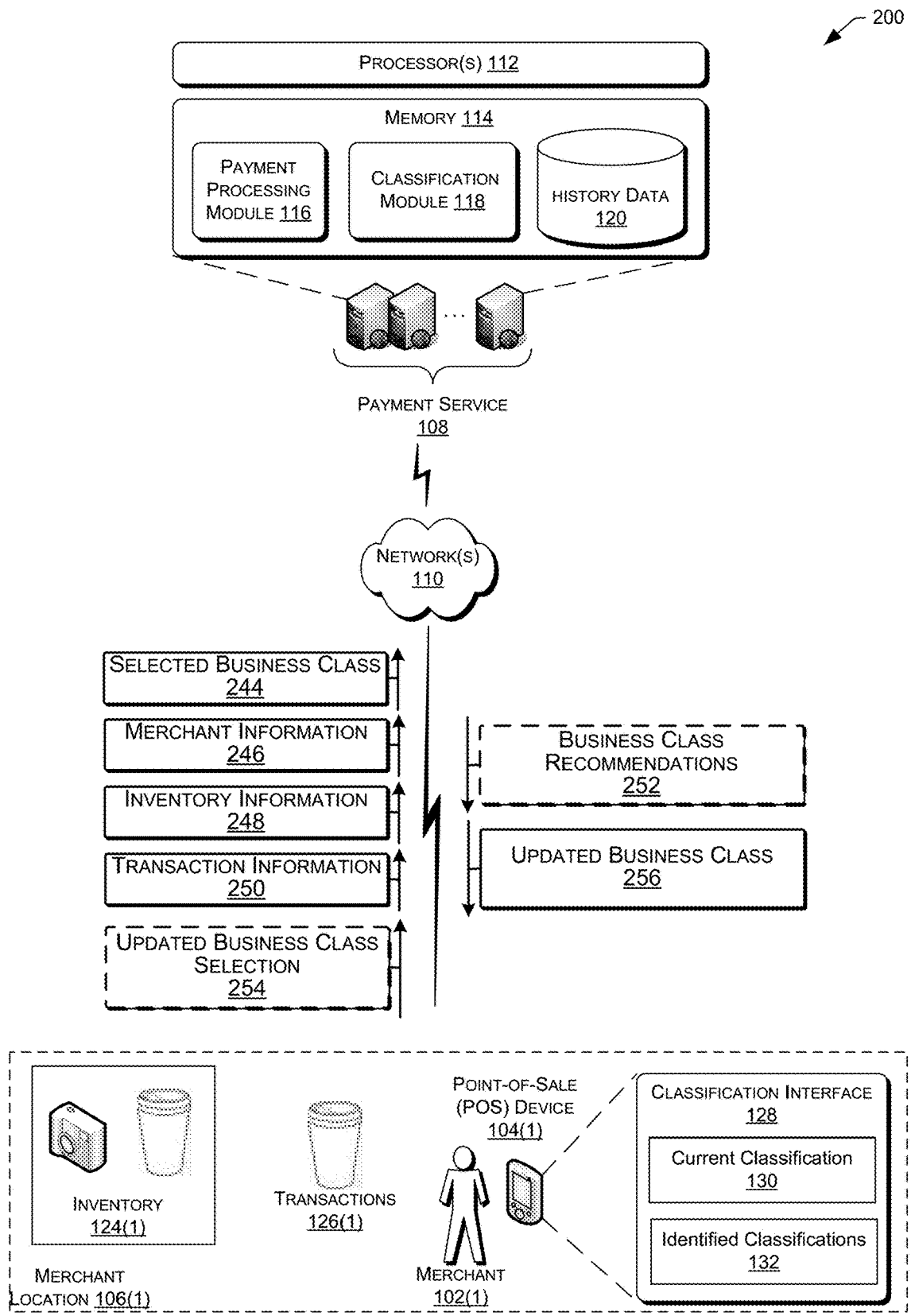
FIG. 2 illustrates an example that includes a merchant sending data to a payment service and in response, receiving an updated business classification from the payment service. In this example, the data includes a selected business class, merchant information, inventory information, and transaction information.

FIG. 2 illustrates an example that includes the merchant 102(1) sending data to the payment service 108 and in response, receiving an updated business classification from the payment service 108. In this example, the data includes both reported data and collected data. For instance, the reported data in FIG. 2 includes a selected business class 244, merchant information 246, and inventory information 248. The collected data includes transaction information 250.

The selected business class 244 can include the business class that the merchant 102(1) selects at the time the merchant 102(1) is first required to select a business class and/or the current business class assigned to the merchant 102(1). For instance, credit card companies may require the merchant 102(1) to select a business class (e.g., MCC) when the merchant 102(1) starts accepting cards from the credit card companies as a form of payment. As such, the merchant 102(1) can select the selected business class 244, which can then be reported to the payment service 108.

The merchant information 246 can include general information about the merchant 102(1). For instance, the merchant information 246 can include a business name of the merchant 102(1), the geographical location (e.g., merchant location 106(1)) of the merchant 102(1), an email address of the merchant 102(1), or other sorts of general information that the merchant 102(1) can send to the payment service 108. Additionally, the inventory information 248 can include information corresponding to the inventory 124(1) that the merchant 102(1) offers to customers. For instance, the inventory information 248 can include a class of items and/or services that the merchant 102(1) offers to customers.

The transaction information 250 can include payment activity for the merchant 102(1) and/or a class of items that the merchant 102(1) provides (e.g., sells, leases, rents, etc.) to customers. The payment activity can include the revenue of the merchant 102(1), percentage of tips that the merchant 102(1) receives, ticket sizes for the merchant 102(1), and/or volumes of items customers acquire from the merchant 102(1). The class of items the merchant 102(1) provides to the customers can include each of the transactions 126(1) that the merchant 102(1) has with customers for good and/or services.

FIG. 2 further illustrates that the payment service 108 may optionally send business class recommendations 252 to the POS device 104(1) of the merchant 102(1). For instance, the payment service 108 can use the selected business class 244, the merchant information 246, the inventory information 248, and the transaction information 250 to identify one or more business classes for the merchant 102(1). The one or more business classes may include the selected business class 244, or the one or more business classes may not include the selected business class 244. Either way, the payment service 108 can send the one or more business classes as business class recommendations 252 to the POS device 104(1) of the merchant 102(1). The merchant 102(1) can then select one of the business classes using the POS device 104(1) and send a message indicating the selected business class to the payment service 108, where the message corresponds to updated business class selection 254.

FIG. 2 further illustrates the payment service 108 sending an updated business class 256 to the POS device 104(1) of the merchant 102(1). For instance, the payment service 108 may implement one or more of the selection rules described above and/or the updated business selection 254 to classify or reclassify the merchant 102(1) within a business class. The payment service 108 can then send the business class to the POS device 104(1) of the merchant as updated business class 256.

FIG. 3 illustrates an example merchant classification interface 128 that the POS device 104(1) of the merchant 102(1) can display, where the merchant classification interface 128 includes a four identified business classes for the merchant's 102(1). FIG. 3 illustrates, for instance, where the payment service 108 sends the business class recommendation 252 to the merchant 102(1) based on the payment service 108 identifying that the merchant 102(1) is classified within the wrong business class. For example, the payment service 108 may have identified each of business class 5411, business class 5462, business class 5499, and business class 5914 for the merchant 102(1) based on the reported data, the collected data, and/or the third-party data described above.

For instance, the merchant 102(1) may have originally selected business class 5399 based on the inventory 124(1) of the merchant 102(1). Business class 5399 corresponds to businesses that offers miscellaneous general merchandise, such as the electronics and the food of inventory 124(1). However, the payment service 108 can use the collected data from the merchant 102(1) to determine that the vast majority of the items that the merchant 102(1) actually provides (e.g., transactions 126(1)) is food. Therefore, the payment service 108 can identify business classes that better classify the merchant's 102(1) business based on the collected data. The payment service 108 can then send the identified business classes to the POS device 104(1) of the merchant 102(1) so that the merchant 102(1) can select a new business class.

For example, the identified business classes for the merchant 102(1) include business class 5411, which is associated with grocery stores and supermarkets, business class 5462, which is associated with bakeries, business class 5499, which is associated with miscellaneous food stores, and business class 5914, which is associated with fast food restaurants.

Figure 4A:
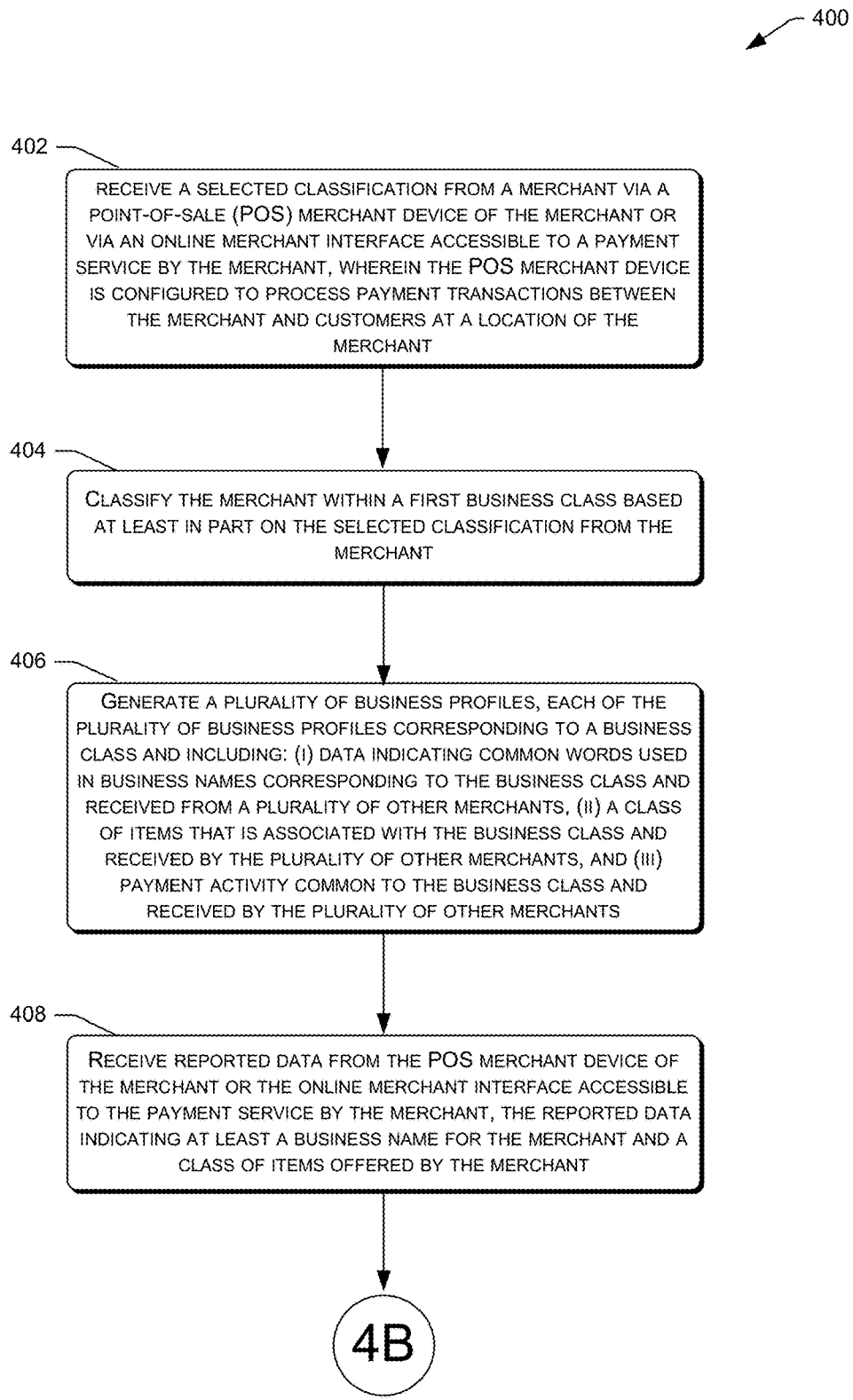
FIGS. 4A-4B illustrate a flow diagram of a process for reclassifying a merchant within a new business class.
Figure 4B:
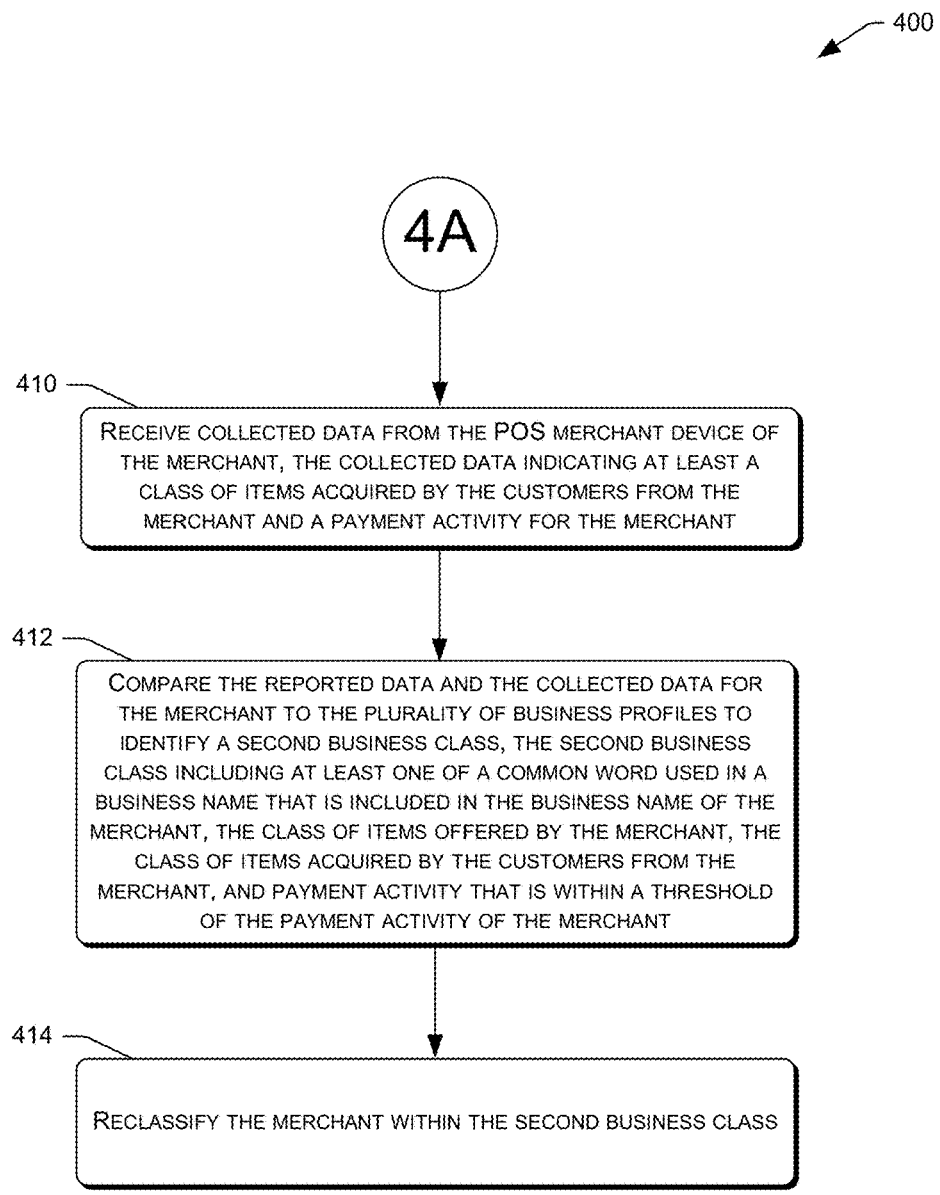

FIGS. 4A-4B illustrate a flow diagram of a process for reclassifying a merchant within a new business class. The process 400 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 400, and other processes described herein, may be performed by a POS device, by a remote payment service (e.g., payment service 108), by another entity, or by a combination thereof.

At 402, the process 400 receives a selected classification from a merchant via a point-of-sale (POS) merchant device of the merchant or via an online merchant interface accessible to a payment service by the merchant, wherein the POS merchant device is configured to process payment transactions between the merchant and a customer at a location of the merchant. For instance, the merchant can select the selected classification when the merchant start accepting credit cards as a form of payment. The payment service can then receive the selected classification from the merchant.

At 404, the process 400 classifies the merchant within a first business class based at least in part on the selected classification from the merchant. The payment service can classify the merchant in a first business class based at least in part on the selected classification.

At 406, the process 400 generates a plurality of business profiles, each of the plurality of business profiles corresponding to a business class and including: (i) data indicating common words used in business names corresponding to the business class and received from a plurality of other merchant, (ii) a class of items that is associated with the business class and received by the plurality of other merchants, and (iii) payment activity common to the business class and received by the plurality of other merchants. For instance, the payment service can generate the plurality of business profiles using data that the payment service receives from merchants classified within each of the business profiles.

At 408, the process 400 receives reported data from the POS merchant device of the merchant or the online merchant interface accessible to the payment service by the merchant, the reported data indicating at least a business name for the merchant and a class of items offered by the merchant. For instance, the payment service can receive the reported data from the POS device of the merchant or the online merchant interface accessible to the payment service by the merchant.

At 410, the process 400 receives collected data from the POS merchant device of the merchant, the collected data indicating at least a class of items acquired by customers from the merchant and a payment activity for the merchant. For instance, the payment service can receive the collected data from the POS device of the merchant.

At 412, the process 400 compares the reported data and the collected data for the merchant to the plurality of business profiles to identify a second business class, the second business class including at least one of a common word used in a business name that is included in the business name of the merchant, the class of items offered by the merchant, the class of items acquired by customers from the merchant, and payment activity that is within a threshold of the payment activity of the merchant. For instance, the payment service can compare the reported data and the collected data for the merchant to the plurality of business profiles to identify the second business class for the merchant.

At 412, the process reclassifies the merchant within the second business class. For instance, the payment service can reclassify the merchant within the second business class. In some examples, the payment service reclassifies the merchant in response to identifying the second class.

Figure 5:
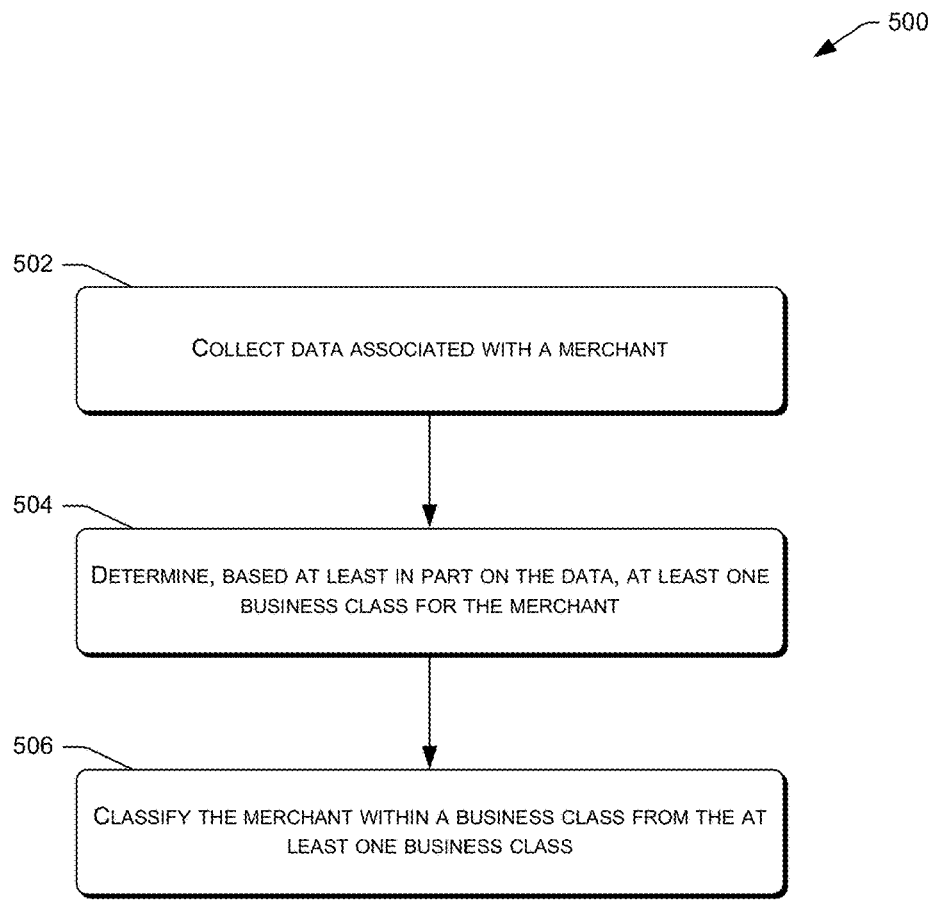
FIG. 5 illustrates a flow diagram of a process for classifying a merchant within a business class using data associated with the merchant.

FIG. 5 illustrates a flow diagram of a process 500 for classifying a merchant within a business class using data associated with the merchant. At 502, the process 500 collects data associated with a merchant. For instance, a payment service and/or a POS device of the merchant can collect data associated with the merchant. As discussed above, the data can include reported data, collected data, and third-party data.

At 504, the process 500 determines, based at least in part on the data, at least one business class for the merchant. For instance, the payment service and/or the POS device of the merchant can compare the data to a plurality of business profiles in order to identify at least one business class for the merchant. In comparing, the payment service and/or the POS device of the merchant can identify business profiles that include similar data as the data associated with the merchant.

At 506, the process 500 classifies the merchant within a business class from the at least one business class. For instance, the payment service and/or the POS device of the merchant can implement one or more rules to select the business class. As discussed the above, the rules can cause the payment service and/or the POS device to select the business class that is most beneficial to the merchant. For example, the rules can cause the payment service and/or the POS device to select the business class that requires the merchant to pay the least amount in fees.

Figure 6:
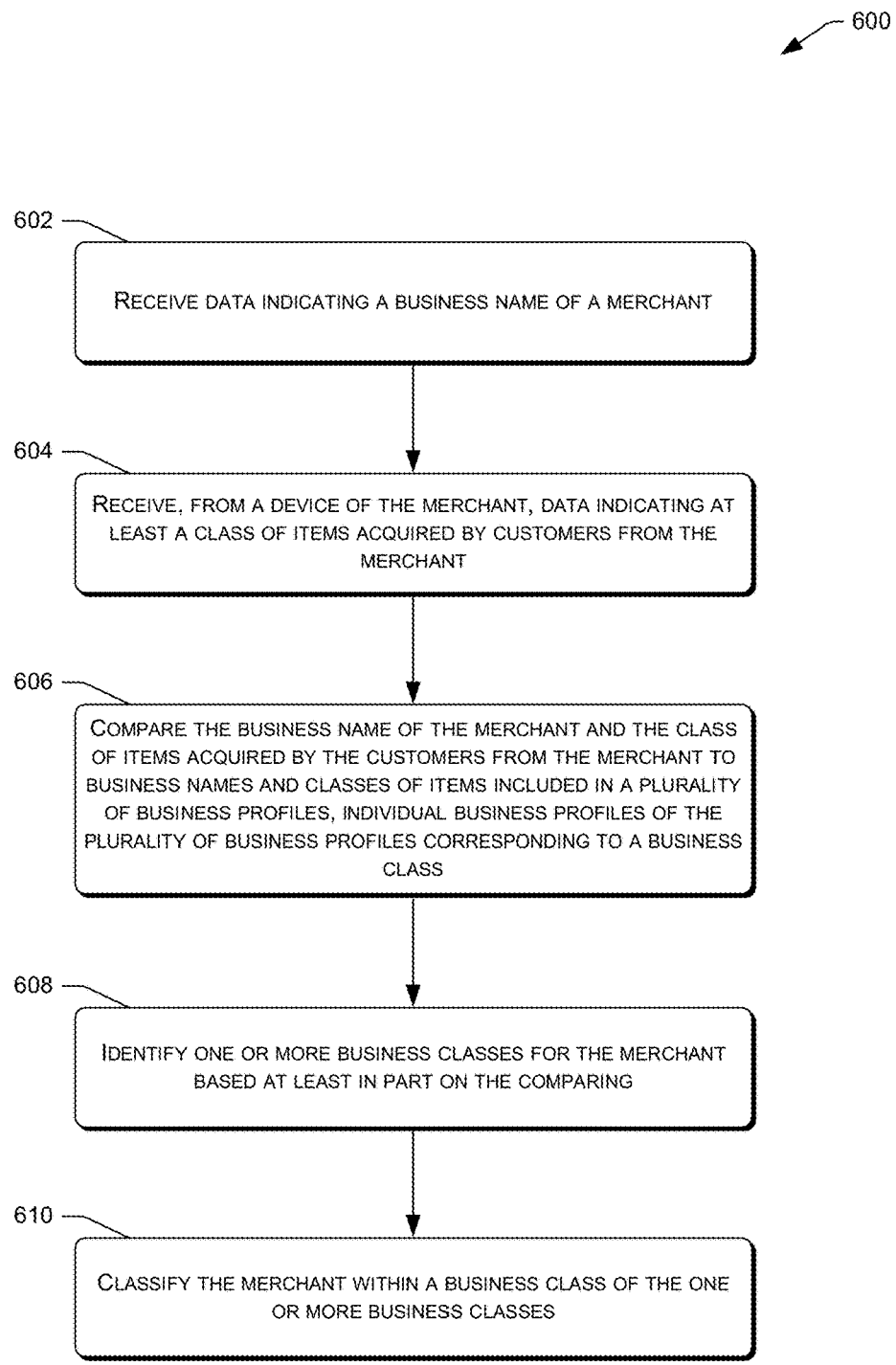
FIG. 6 illustrates a flow diagram of a process for a payment service classifying a merchant within a business class using reported data and collected data from the merchant.

FIG. 6 illustrates a flow diagram of a process 600 for a payment service classifying a merchant within a business class using reported data and collected data from the merchant. At 602, the process 600 receives data indicating a business name of the merchant. For instance, a payment service can receive reported data from a POS device of the merchant. The reported data can include the business name of the merchant.

At 604, the process 600 receives, from a device of the merchant, data indicating at least one class of items acquired by customers from the merchant. For instance, the payment service can receive, from the POS device of the merchant, collected data. The collected data can indicate a class of items that customers have been acquiring from the merchant. In some examples, the collected data corresponds to a specific time period, such as in the last week, month, year, or the like.

At 606, the process 600 compares the business name of the merchant and the class of items acquired by the customers from the merchant to business names and classes of items included in a plurality of business profiles, individual business profiles of the plurality of business profiles corresponding to a business class. For instance, the payment service can compare the business name of the merchant and the class of items acquired by the customers from the merchant to business names and classes of items included in a plurality of business profiles.

For business names, the payment service can use one or more from the business names of the merchant and compare the one or more words to business names included in the plurality of business profiles. They payment service can then identify business names in the plurality of business profiles that also use the one or more words.

At 608, the process 600 identifies one or more business classes for the merchant based at least in part on the comparing. For instance, the payment service can identify one or more business classes for the merchant based on the comparing. As discussed above, each of the business class profiles can be associated with a business class. As such, the payment service can use business class profiles that include a similar business names as the business name of the merchant and/or include the class of items acquired by customers from the merchant to identify the one or more business classes.

At 610, the process 600 classifies the merchant within a business class of the one or more business classes. For instance, the payment service can classify the merchant within the business class and/or reclassify the merchant within the business class if the merchant is already classified in a different business class.

Figure 7:
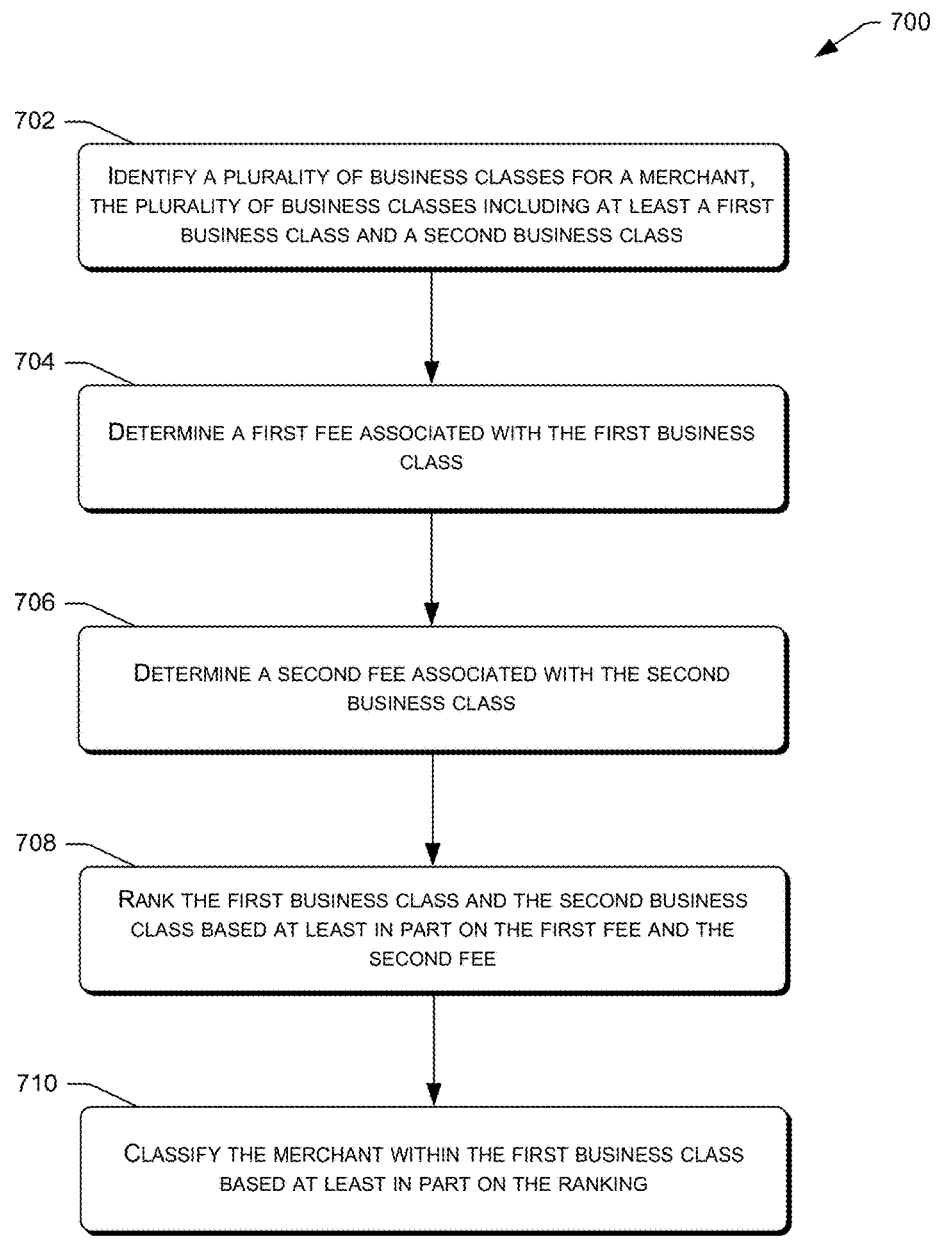
FIG. 7 illustrates a flow diagram a process for selecting a business class from a plurality of identified business classes for a merchant.

FIG. 7 illustrates a flow diagram a process 700 for selecting a business class from a plurality of identified business classes for a merchant.

At 702, the process 700 identifies a plurality of business classes for a merchant, the plurality of business classes including at least a first business class and a second business class. For instance, a payment service and/or a POS device of a merchant can identify a plurality of business classes for the merchant using reported data, collected data, and third-party data associated with the merchant.

At 704, the process 700 determines a first fee associated with the first business class and at 706, the process 700 determines a second fee associated with the second business class. For instance, and as discussed above, credit card companies and/or other entities may require the merchant to pay different rates (e.g., fees) based on which business class (e.g., MCC) is assigned to the merchant. As such, the payment service and/or the POS device of the merchant can determine a first fee (e.g., first rate) associated with the first business class and a second fee (e.g., second rate) associated with the second business class.

At 708, the process 700 ranks the first business class and the second business class based at least in part on the first fee and the second fee. For instance, the payment service and/or the POS device of the merchant can rank the first business class and the second business class from the lowest fee business class to the highest fee business class. For example, if the first fee associated with the first business class is lower than the second fee associated with the second business class, then the payment service and/or the POS device may rank the first business class first and the second business class second.

At 710, the process 700 classifies the merchant within the first business class based at least in part on the ranking. For instance, the payment service and/or the POS device of the merchant can classify the merchant within the first business class and/or reclassify the merchant within the first business class if the merchant is not already classified within the first business class based at least in part on the ranking. As such, the payment service and/or the POS device classifies and/or reclassifies the merchant within the business class that charges the merchant the lowest rate of fees.

It should be noted that the process 700 can be applied to more than two business classes. Additionally, besides ranking the business classes based on fees, the business classes can optionally be ranked based on other criteria. For instance, the business classes can be ranked based on any other criteria that may be beneficial to the merchant. For example, the business classes can be ranked based on any criteria that prioritizes selection of certain business classes over other business classes.

Figure 8:
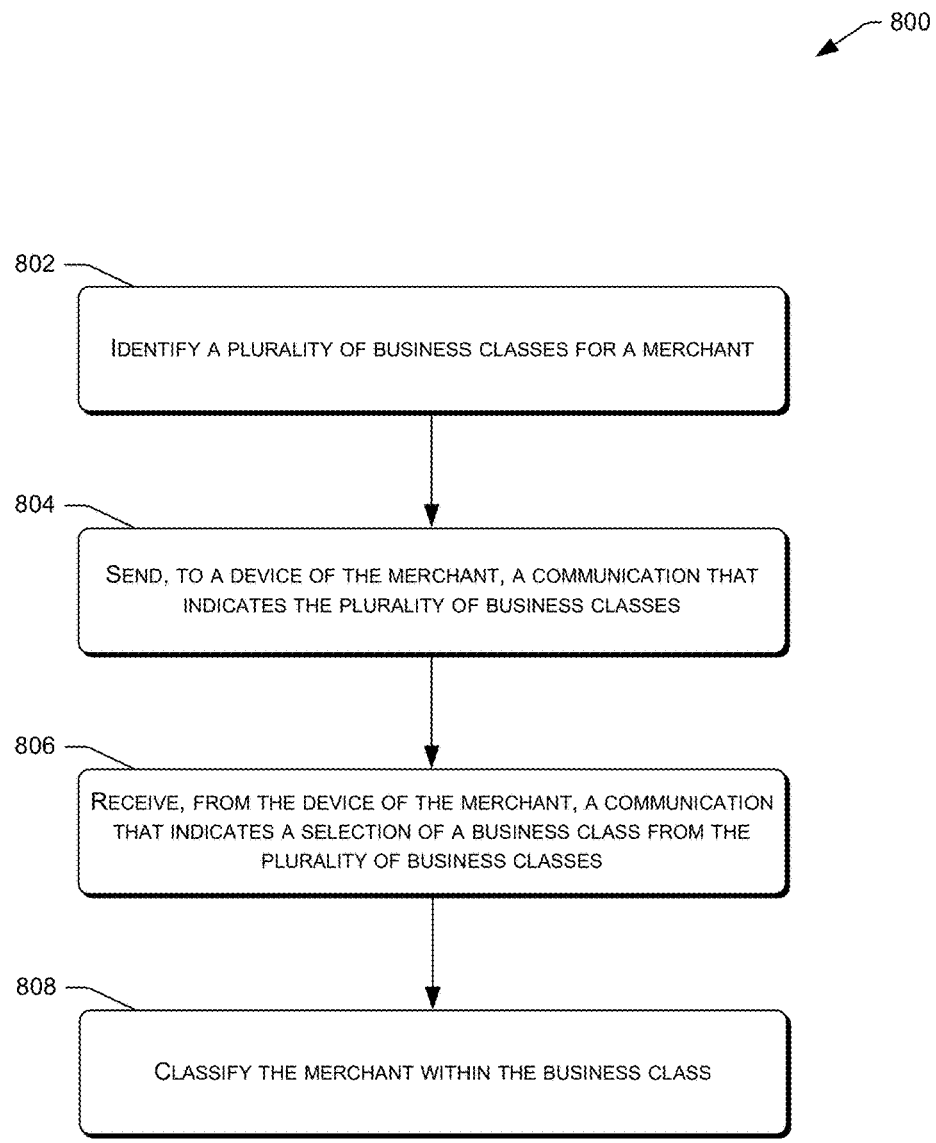
FIG. 8 illustrates a flow diagram of a process for providing a merchant with identified business classes so that the merchant can select a business class for classification.

FIG. 8 illustrates a flow diagram of a process 800 for providing a merchant with identified business classes so that the merchant can select a business class for classification.

At 802, the process 800 identifies a plurality of business classes for a merchant. For instance, the payment service can identify the plurality of business classes for the merchant using reported data, collected data, and third-party data associated with the merchant.

At 804, the process 800 sends, to a device of the merchant, a communication that indicates the plurality of business classes. For instance, the payment service can send a communication to the POS device of the merchant that indicates the plurality of business classes.

At 806, the process 800 receives, from the device of the merchant, a communication that indicates a selection of a business class from the plurality of business classes. For instance, the payment service can receive a communication from the POS device of the merchant that indicates a selection of business class from the plurality of business class. At 808, the process 800 classifies the merchant within the business class. For instance, the payment service can classify the merchant within the business class and/or reclassify the merchant within the business class if the merchant is already classified in a different business class.

FIG. 9 illustrates select example components of an example POS device 900 according to some implementations. The POS device 900 may be any suitable type of computing device, e.g., mobile, semi-mobile, semi-stationary, or stationary. Some examples of the POS device 900 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the POS device 900 includes at least one processor 902, memory 904, a display 906, one or more input/output (I/O) components 908, one or more network interfaces 910, at least one card reader 912, at least one location component 914, and at least one power source 916. Each processor 902 may itself comprise one or more processors or processing cores. For example, the processor 902 can be implemented as one or more microprocessors, microcomputers, microcontrollers, digital signal processors, central processing units, state machines, logic circuitries, and/or any devices that manipulate signals based on operational instructions. In some cases, the processor 902 may be one or more hardware processors and/or logic circuits of any suitable type specifically programmed or configured to execute the algorithms and processes described herein. The processor 902 can be configured to fetch and execute computer-readable processor-executable instructions stored in the memory 904.

Depending on the configuration of the POS device 900, the memory 904 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 904 may include, but is not limited to, RAM, ROM, EEPROM, flash memory, solid-state storage, magnetic disk storage, optical storage, and/or other computer-readable media technology. Further, in some cases, the POS device 900 may access external storage, such as RAID storage systems, storage arrays, network attached storage, storage area networks, cloud storage, or any other medium that can be used to store information and that can be accessed by the processor 902 directly or through another computing device or network. Accordingly, the memory 904 may be computer storage media able to store instructions, modules or components that may be executed by the processor 902. Further, when mentioned, non-transitory computer-readable media exclude media such as energy, carrier signals, electromagnetic waves, and signals per se.

The memory 904 may be used to store and maintain any number of functional components that are executable by the processor 902. In some implementations, these functional components comprise instructions or programs that are executable by the processor 902 and that, when executed, implement operational logic for performing the actions and services attributed above to the POS device 900. Functional components of the POS device 900 stored in the memory 904 may include a merchant application 918, which may interact with applications executing on client devices to allow customers to pay for items offered by the merchant. The merchant application 918 may present an interface on the POS device 900 to enable the merchant to conduct transactions, receive payments, and so forth, as well as communicating with the payment service 108 for processing payments and sending transaction information. Further, the merchant application 918 may present an interface to enable the merchant to manage the merchant's account, and the like. Finally, the merchant application 918 may send data associated with the merchant to the payment service, and receive one or more suggest business classes from the payment service. After receiving the one or more suggested business classes, the merchant application 918 can enable the merchant to select one of the business classes and send the selection back to the payment service.

Additional functional components may include an operating system 920 for controlling and managing various functions of the POS device 900 and for enabling basic user interactions with the POS device 900. The memory 904 may also store transaction data 922 that is received based on the merchant associated with the POS device 900 engaging in various transactions with customers, such as the example customer from FIG. 1.

In addition, the memory 904 may also store data, data structures and the like, that are used by the functional components. For example, this data may include item information that includes information about the items offered by the merchant, which may include images of the items, descriptions of the items, prices of the items, and so forth. Depending on the type of the POS device 900, the memory 904 may also optionally include other functional components and data, which may include programs, drivers, etc., and the data used or generated by the functional components. Further, the POS device 900 may include many other logical, programmatic and physical components, of which those described are merely examples that are related to the discussion herein.

The network interface(s) 910 may include one or more interfaces and hardware components for enabling communication with various other devices over the network or directly. For example, network interface(s) 910 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 9 further illustrates that the POS device 900 may include the display 906 mentioned above. Depending on the type of computing device used as the POS device 900, the display 906 may employ any suitable display technology. For example, the display 906 may be a liquid crystal display, a plasma display, a light emitting diode display, an OLED (organic light-emitting diode) display, an electronic paper display, or any other suitable type of display able to present digital content thereon. In some examples, the display 906 may have a touch sensor associated with the display 906 to provide a touchscreen display configured to receive touch inputs for enabling interaction with a graphic interface presented on the display 906. Accordingly, implementations herein are not limited to any particular display technology. Alternatively, in some examples, the POS device 900 may not include the display 906, and information may be present by other means, such as aurally.

The I/O components 908, meanwhile, may include speakers, a microphone, a camera, and various user controls (e.g., buttons, a joystick, a keyboard, a keypad, etc.), a haptic output device, and so forth.

In addition, the POS device 900 may include or may be connectable to a payment instrument reader 912. In some examples, the reader 912 may plug in to a port in the merchant device, such as a microphone/headphone port, a data port, or other suitable port. In other instances, the reader 912 is integral with the entire POS device 900. The reader 912 may include a read head for reading a magnetic strip of a payment card, and further may include encryption technology for encrypting the information read from the magnetic strip. Alternatively, numerous other types of card readers may be employed with the POS devices 900 herein, depending on the type and configuration of a particular POS device 900.

The location component 914 may include a GPS device able to indicate location information, or the location component 914 may comprise another other location-based sensor. The POS device 900 may also include one or more additional sensors (not shown), such as an accelerometer, gyroscope, compass, proximity sensor, and the like. Additionally, the POS device 900 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method implemented by one or more servers of a payment service, the method comprising:
   providing, by the one or more servers of the payment service, an instance of a merchant application, that when installed on a computing device of a merchant, configures the computing device as a point-of-sale (POS) device for processing payment transactions between the merchant and customers of the merchant and sending transaction data associated with the transactions to the one or more servers of the payment service;
   receiving, by the one or more servers of the payment service, a selected classification from the merchant via a user interface presented via the merchant application or via an online merchant interface;
   classifying, by the one or more servers of the payment service, the merchant within a first business class based at least in part on the selected classification from the merchant;
   receiving, by the one or more servers of the payment service, reported data from the merchant application or the online merchant interface, the reported data indicating at least one of a business name of the merchant or a class of items offered by the merchant;
   determining, by the one or more servers of the payment service, collected data based at least in part on the transaction data, the collected data indicating at least one of a class of items acquired by the customers from the merchant or payment activity for the merchant;
   determining, by the one or more servers of the payment service and based at least in part on comparing the reported data and the collected data, that the merchant is incorrectly classified in the first business class;
   identifying, by the one or more servers of the payment service and based at least in part on (i) determining that the merchant is incorrectly classified in the first business class and (ii) a classification rule, a second business class for classifying the merchant;
   sending, by the one or more servers of the payment service, an indication of the first business class and the second business class to the merchant application;
   receiving, by the one or more servers and from the merchant application, an indication of a selection of the second business class; and
   reclassifying, by the one or more servers of the payment service and based at least on the selection of the second business class, the merchant within the second business class.

2. The method as recited in claim 1, further comprising:
   generating, based at least in part on the reported data and the collected data, a business profile for the merchant; and
   comparing the business profile for the merchant to a plurality of business profiles, wherein determining that the merchant is incorrectly classified is based at least in part on the comparing of the business profile for the merchant to the plurality of business profiles.

3. The method as recited in claim 1, wherein the classification rule is associated with selecting a particular business class that includes a lowest rate of fees, and the method further comprises:
   determining first fees associated with the first business class;
   determining second fees associated with the second business class; and
   ranking the first business class and the second business class based at least in part on the first fees and the second fees.

4. The method as recited in claim 1, further comprising receiving customer reviews for the merchant, and wherein identifying the second business class is based at least in part on the customer reviews.

5. The method as recited in claim 1, wherein the second business class includes at least one of a common word used in a business name that is included in the business name of the merchant, the class of items offered by the merchant, the class of items acquired by the customers from the merchant, or payment activity that is within a threshold of the payment activity of the merchant.

6. The method as recited in claim 2, further comprising, prior to comparing the business profile for the merchant to the plurality of business profiles, generating the plurality of business profiles, each of the plurality of business profiles corresponding to a respective business class and including at least one of: (i) data indicating common words used in business names corresponding to the respective business class and received by a plurality of other merchants, (ii) a class of items that is associated with the respective business class and received by the plurality of other merchants, or (iii) payment activity common to the respective business class and received by the plurality of other merchants.

7. One or more non-transitory computer-readable media storing computer executable instructions that, when executed on one or more processors, cause the one or more processors to perform acts comprising:
   providing, to a computing device operable by a merchant, an instance of a merchant application, wherein when the merchant application is installed on the computing device, the merchant application configures the computing device as a point-of-sale (POS) device, and wherein the merchant application determines transaction data based on payment information received via a card reader associated with the POS device and transmits the transaction data to one or more server computing devices associated with a payment service;
   receiving, by the one or more server computing devices and from the merchant application, an indication of a selection of a first business class via a user interface presented via the merchant application;
   classifying, by the one or more server computing devices, the merchant within the first business class based at least in part on the receiving of the indication of the selection;
   receiving, by the one or more server computing devices and from the merchant application, reported data from the merchant, wherein the reported data includes at least one of a business name of the merchant or a class of items offered by the merchant;

receiving, by the one or more server computing devices and from the merchant application, the transaction data;

determining, by the one or more server computing devices and based at least on analyzing the transaction data, collected data associated with the merchant, wherein the collected data includes at least one of a class of items acquired by customers from the merchant or payment activity for the merchant;

comparing, by the one or more server computing devices, the reported data and the collected data;

determining, by the one or more server computing devices and based at least in part on comparing the reported data and the collected data, that the merchant is incorrectly classified in the first business class;

determining, by the one or more server computing devices and based at least in part on (i) determining that the merchant is incorrectly classified in the first business class and (ii) a classification rule, at least a second business class for classifying the merchant;

sending, by the one or more server computing devices, an indication of at least the first business class and the second business class to the merchant application;

receiving, by the one or more server computing devices, an indication of a selection of the second business class; and reclassifying, by the one or more server computing devices, the merchant within the second business class based at least in part on receiving the indication.

8. The one or more non-transitory computer-readable media as recited in claim 7, wherein the determining at least the second business class further comprises determining multiple business classes associated with the class of items acquired by customers of the merchant and wherein the indication further includes other business classes of the multiple business classes.

9. The one or more non-transitory computer-readable media as recited in claim 7, the acts further comprising comparing the collected data for the merchant with a plurality of business class profiles to identify at least one business class profile that is associated with the second business class and includes the at least one of a class of items offered by the merchant or the class of items acquired by the customers from the merchant, and wherein determining the second business class for the merchant is based at least in part on the comparing of the collected data with the plurality of business class profiles.

10. The one or more non-transitory computer-readable media as recited in claim 7, wherein the reported data includes the business name of the merchant, and wherein determining the second business class for the merchant is further based at least in part on the business name of the merchant.

11. The one or more non-transitory computer-readable media as recited in claim 7, the acts further comprising:

receiving, by the one or more server computing devices, one or more reviews associated with the merchant, and wherein determining the second business class for the merchant is further based on the one or more reviews.

12. The one or more non-transitory computer-readable media as recited in claim 7, the acts further comprising:

determining, by the one or more server computing devices, a first merchant fee associated with the first business class;

determining, by the one or more server computing devices, a second merchant fee associated with the second business class; and ranking, by the one or more server computing devices, the first business class and the second business class based at least in part on the first merchant fee and the second merchant fee, and wherein determining the second business class is based at least in part on the ranking.

13. The one or more non-transitory computer-readable media as recited in claim 7, the acts further comprising:

continuing to collect, by the one or more server computing devices, additional data associated with the merchant; and determining, by the one or more server computing devices and at given time intervals, a new business class associated with the additional data.

14. The one or more non-transitory computer-readable media as recited in claim 7, the acts further comprising:

collecting, by the one or more server computing devices and at a later time, additional data for the merchant, the additional data indicating a different class of items acquired by customers from the merchant;

determining, by the one or more server computing devices and based at least in part on the additional data, a different business class for the merchant; and reclassifying, by the one or more server computing devices, the merchant within the different business class based at least in part on the determining of the different class for the merchant.

15. A system comprising:

a merchant application, wherein when the merchant application is installed on a computing device of a merchant, the merchant application configures the computing device as a point-of-sale (POS) device, and wherein the merchant application determines transaction data based on payment information received via a card reader associated with the POS device and transmits the transaction data to one or more server computing devices associated with a payment service;

one or more server computing devices associated with a payment service, the one or more server computing devices comprising:

one or more processors; and one or more computer-readable media storing instructions executable by the one or more processors, wherein the instructions cause the one or more processors to:

receive, by the one or more server computing devices, an indication of a selection of a first business class for classifying the merchant;

receive, by the one or more server computing devices, data indicating a business name of a merchant;

receive, by the one or more server computing devices and from the merchant application, the transaction data, the transaction data indicating at least a class of items acquired by one or more customers from the merchant;

generate, by the one or more server computing devices and based at least in part on receiving the transaction data and additional transaction data associated with one or more other merchants, a plurality of business profiles, wherein each business profile of the plurality of business profiles corresponds to a respective business class including business names and classes of items included in the respective business class;

compare, by the one or more server computing devices, the business name of the merchant and the class of items acquired by the one or more customers from the merchant to the business names and the classes of items included in the plurality of business profiles;

identify, by the one or more server computing devices, one or more business classes based at least in part on comparing the business name of the merchant and the class of items acquired by the one or more customers from the merchant to the business names and the classes of items included in the plurality of business profiles;

determine, by the one or more server computing devices and based at least in part on (i) determining that the merchant is incorrectly classified in the first business class and (ii) a classification rule, a second business class of the one or more business classes for classifying the merchant;

sending, by the one or more server computing devices, an indication of the first business class and at least the second business class to the merchant application;

receiving, by the one or more server computing devices and from the merchant application, an indication of a selection of the second business class; and reclassify, by the one or more server computing devices, the merchant within the second business class.

16. The system as recited in claim 15, wherein the one or more business classes includes the first business class and the second business class, and wherein the instructions further program the one or more processors to:

determine, by the one or more server computing devices, a first merchant fee that is associated with the first business class;

determine, by the one or more server computing devices, a second merchant fee that is associated with the second business class; and rank, by the one or more server computing devices, the first business class and the second business class based at least in part on the first merchant fee and the second merchant fee, and wherein determining the second business class is further based at least in part on the ranking.

17. The system as recited in claim 15, wherein comparing the business name of the merchant to business names included in the plurality of business profiles comprises identifying at least one word from the business name of the merchant that is used in business names of merchants included in the plurality of business profiles.

18. The system as recited in claim 15, wherein the instructions further cause the one or more processors to:

receive, at the one or more server computing devices, customer reviews associated with the merchant, and wherein identifying the one or more business classes for the merchant is further based at least in part on the customer reviews.

19. The system as recited in claim 15, wherein the classification rule is associated with selecting a particular business class that is expected to increase business for the merchant.

20. The system as recited in claim 15, wherein the indication of the selection of the first business class is received in association with onboarding the merchant onto the payment service.

* * * * *